(12) United States Patent
Meier et al.

(10) Patent No.: US 7,630,154 B2
(45) Date of Patent: Dec. 8, 2009

(54) HARD DISK INSPECTION METHOD AND SYSTEM

(75) Inventors: Stephen Frank Meier, Fremont, CA (US); David H. Ferry, Boulder Creek, CA (US)

(73) Assignee: MRA Tek, LLC, Fremont, CA (US)

( * ) Notice: Subject to any disclaimer, the term of this patent is extended or adjusted under 35 U.S.C. 154(b) by 596 days.

(21) Appl. No.: 11/398,033

(22) Filed: Apr. 4, 2006

(65) Prior Publication Data

US 2007/0229999 A1 Oct. 4, 2007

(51) Int. Cl.
*G11B 5/02* (2006.01)
(52) U.S. Cl. .......................................... 360/25; 360/13
(58) Field of Classification Search ....................... None
See application file for complete search history.

(56) References Cited

U.S. PATENT DOCUMENTS

| | | | | |
|---|---|---|---|---|
| 3,761,905 | A | * 9/1973 | Hollstein et al. | ............... 360/25 |
| 5,563,746 | A | * 10/1996 | Bliss | ............................ 360/53 |
| 2002/0097640 | A1* | 7/2002 | Seo et al. | .................. 369/13.24 |
| 2006/0109000 | A1* | 5/2006 | Makino et al. | ............... 324/212 |

\* cited by examiner

*Primary Examiner*—Jason C Olson
(74) *Attorney, Agent, or Firm*—Townsend and Townsend and Crew LLP

(57) ABSTRACT

A method an apparatus for testing the surface of hard disk platters having vertically oriented magnetic domains is disclosed. According to the method of the present invention, all of the magnetic domains on the surface of the disk to be tested are oriented in the same direction, so that the magnetic field intensity adjacent to the surface is ideally uniform. The surface is then scanned using a read head to identify perturbations in the magnetic field intensity which correlate to surface defects.

16 Claims, 3 Drawing Sheets

HARD DISK INSPECTION METHOD AND SYSTEM

FIELD OF THE INVENTION

The invention relates generally to the field of testing magnetic recording media, and is specifically directed to a method and system for inspecting vertical magnetic media on hard disk platters after they are manufactured.

BACKGROUND OF THE INVENTION

Hard disks drives have become ubiquitous for high volume, non-volatile storage of electronic data. While principally used as data storage devices for computing systems, hard drives have found additional uses, including, for example, in video and audio recording systems, and in small, highly portable music playback systems. As with many types of electronic devices, very substantial efforts have been made over recent years to increase the performance of hard disk drives. These efforts have primarily been directed to increasing hard disk storage capacity, reliability and robustness, while reducing cost, size, and data access (read/write) times.

In hard disk drives data is stored on a spinning hard disk or platter, using a recording head, in digital form, as a series of binary bits, each of which is stored at a precise, known, physical location on a surface of the disk. Typically, modern hard disk drives comprise multiple, coaxial, stacked platters, each of which comprises an aluminum or other substrate having a magnetic film deposited on both the upper and lower surfaces of the platter. As is well known in the art, data is stored by the polarization of the magnetic domains in small, well-defined areas of the magnetic film on the platter. The magnetic domains are oriented using a disk drive write head comprising a coil used to transmit a precise electromagnetic signal to orient the magnetization of a domain on the surface of the disk immediately adjacent to the head. In this manner the magnetic field at the surface of the disk at a given location is made to represent either a logical 1 or 0, corresponding to the desired binary bit value, and can thereafter be read back (or changed) using the read/write head. In practical terms, as is well known, the data is actually stored in the form of magnetic transitions from one domain to the next.

It can be appreciated that the amount of data that can be stored on a hard disk drive is a function of both the overall available area on the disk surface and the area required to store each bit (including the area necessary to separate adjacent bit storage locations). For practical reasons, the size of the disks has actually been decreasing. Accordingly, in order to increase storage capacity, great attention has been paid to reducing the already very small area on the surface of the disk necessary to store data bits. Important factors in this effort include reducing the separation distance between the read/write (the "flying height"), improving the uniformity of the magnetic film, and reducing the size of the domains so that very small areas on the usable surface of a disk can be reliably used for data storage. However, as the areal extent of the magnetic surface used for storage of a data bit is decreased, any small defects or imperfections in the area take on greater significance.

In traditional prior art hard disk drives the magnetic domains 10 are horizontally or "longitudinally" aligned on the surface of the magnetic film as depicted in FIG. 1A. Reversing the magnetization of a domain relative to the adjacent domains, causes a magnetic transition 20 which is detectable when a read/write head passes over the transition area and detects a variation in the magnetic flux above the surface of the magnetic film. However, there are practical limits to the size of horizontal magnetic domains. Specifically, after a limit is reached, smaller magnetic domains are inherently unstable due to thermal fluctuations.

New generations of hard disk drives use vertically polarized magnetic domains 30 to reduce the amount of space needed to store data, and shown in FIG. 1B. Again, magnetic transitions 40 between adjacent domains can be created using a write head and, thereafter, detected using a read head. One estimate is that vertical magnetic polarization, or "perpendicular" data storage, can increase the storage capacity of a disk ten-fold. However, vertical drives use thicker magnetic films and require a "soft" magnetically permeable underlayer 50, which can increase the manufacturing difficulty of achieving a highly uniform, planar surface.

Normally, the disk surface may be viewed as comprising a plurality of contiguous annular regions or "tracks" that are used for data storage. Track widths of vertical hard disks are of the order of 100 nanometers, and track density is of the order of 2,400,000 transitions per inch.

As can be understood from FIG. 1B, when all of the magnetic domains of a vertical disk are aligned in the same direction, i.e., when there are no transitions, the entire surface has a single magnetic polarity and the magnetic field adjacent to the surface of the disk is substantially uniform. In contrast, when there are no transitions in a horizontal disk, the magnetic field varies with location.

After manufacture, the platters of a hard disk drive need to be tested for defects and to ensure that they meet specifications. Testing is typically performed on unformatted disk platters prior to final disk drive assembly. For the reasons discussed above, the specifications are becoming more stringent as smaller disk areas are used for data storage. Small scratches, pits and other defects in the surface of the magnetic film are particularly critical and the existence of any such defects needs to be identified. It is noted that vertical domains can be smaller than optical detection limits, such that optical inspection of the disk surface cannot be used to identify surface irregularities that impact device performance. Accordingly, there is a need for a system and method of rapidly testing a vertical hard disk drive to detect very small surface imperfections.

A common testing technique currently in use is referred to as the "missing pulse test." The missing pulse test involves writing a sinusoidal waveform to the surface of the disk using a write head, and then reading back the recorded signal using a read head. Since a sine wave has two transitions per cycle, the read back frequency is twice the write frequency. Discrepancies, referred to as "dropouts", between what is written and what is read are used to identify disk errors. As domain size has decreased, it has become necessary to use higher frequency to properly analyze the surface of a disk. Currently, write frequencies as high as 200 MHz (and corresponding read frequencies of 400 MHz) may be used.

SUMMARY OF THE INVENTION

Accordingly, the present invention is directed to a method and apparatus for testing hard disk platters having vertically oriented magnetic domains. In one embodiment, the invention is directed to a method of inspecting an unformatted hard disk platter having vertically oriented magnetic domains for defects, comprising the steps of orienting the magnetic domains in the same vertical direction and scanning the surface of the disk using a read head to identify perturbations in the magnetic field intensity. The step of orienting the magnetic domains can be accomplished by performing a DC erase of the disk surface, such as in a bulk erase operation. Alternatively, the step of performing a DC erase may comprise using a write signal from a write head to sequentially oriented domains. Preferably, the step of scanning the surface of the disk comprises sampling the signal picked up by the read head at a high frequency. In one embodiment, the method comprises filtering the analog signal from the read head, using low frequency components of the filtered signal for automatic gain control, and using high frequency components of the filtered signal to identify variations in the magnetic field picked up by the read head. The sample rate can, for example, exceed 250 MHz. Scanning may be performed on a plurality of concentric tracks or in a spiral. Preferably, an error signal is generated when the magnetic field detected by the read head varies by a predetermined, user selected threshold amount for a user selected predetermined duration. Preferably the gain of the read head signal is calibrated before testing, such as each time a new disk is tested.

In another aspect, the present invention is directed to a system for quality testing hard disks having vertically oriented magnetic domains, comprising means for orienting the magnetic domains of the hard disk in the same direction, a read head comprising a magnetic sensor for detecting the magnetic field at the surface of the disk adjacent to the read head, a transport mechanism for providing relative motion between the surface of the disk and the read head such that the read head is able to access substantially the entire useable surface of the disk, a signal analyzer for analyzing the output signal from the read head, wherein the signal analyzer comprises, a signal amplifier for amplifying the output signal from the read head, a filter coupled to the signal amplifier for removing low frequency variations in the amplified signal, an automatic gain control (AGC) system coupled to the filter, the AGC system using the low frequency variations to provide automatic gain control, and a measurement system coupled to the filter for detecting high frequency variations in the amplified signal representative of variations in the magnetic field intensity detected by the read head, and for generating an error signal when there is a variation in excess of a predetermined amount.

BRIEF DESCRIPTION OF THE DRAWINGS

The foregoing aspects and the attendant advantages of this invention will become more readily apparent by reference to the following detailed description when taken in conjunction with the accompanying drawings, wherein.

DESCRIPTION OF PREFERRED EMBODIMENTS

Figure 1A:
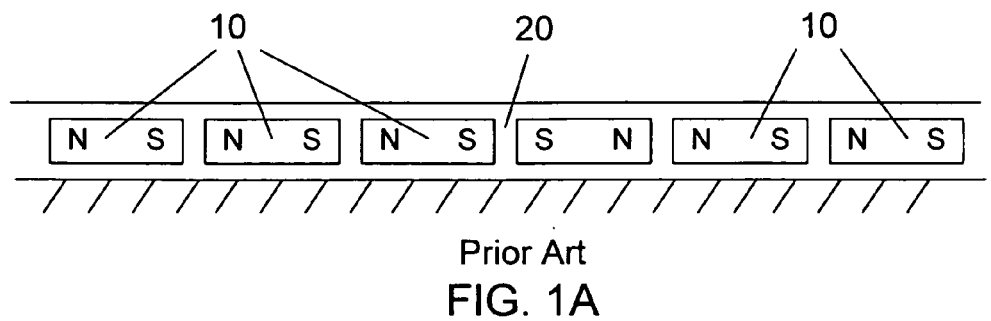
FIG. 1A is a schematic cross-sectional depiction of a portion of the surface of a hard disk having a horizontal magnetic domain orientation.
Figure 1B:
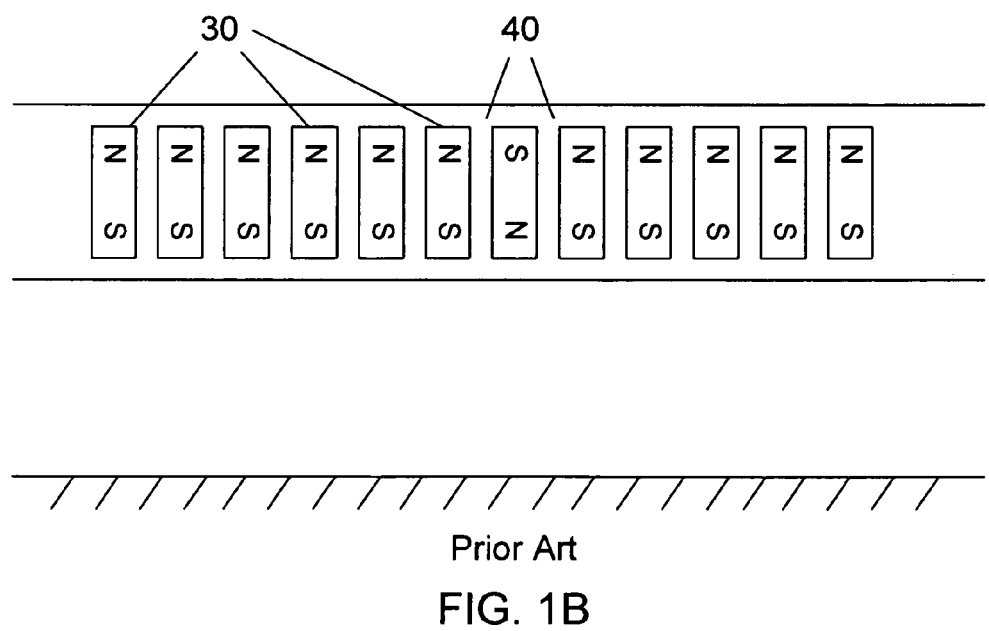
FIG. 1B is a schematic cross-sectional depiction of a portion of the surface of a hard disk having a vertical magnetic domain orientation.

In the following description, numerous specific details are set forth to provide a more thorough description of the specific embodiments of the invention. It will be apparent, however, to one skilled in the art, that the invention may be practiced without all the specific details given below. Consistent numbering is used in the Figures.

The preferred embodiment of the present invention is directed to a method and system for testing the surface of a hard disk platter having vertical magnetic domains. The testing contemplated by the present invention is performed after the disk platters are made, but prior to final assembly and formatting of the hard drive. The basic hardware used for testing hard disk platters are known and need not be described in detail. Generally, such devices include a mechanism for rotating the disk, comprising a spindle, and one or more radially translatable heads for reading and writing to the disk. Typically, radial head translation uses a carriage assembly. The combination of the disk rotation mechanism and the head translation mechanism constitute a transport mechanism by which a head can access the entire usable surface the disk.

Commercially available head units frequently combine both read and write functionality in a single unit, referred to as a read/write head, that is mounted on a carriage assembly. Embodiments of the present invention can be implemented using either combined read/write heads, or separate read and write heads, each of which is mounted on a separate carriage. The latter approach is preferred for the testing method and apparatus of the present invention because separate heads provide greater flexibility and control. According to embodiments of the method of the present invention, relative motion between the read head and the platter can be implemented to individually test concentric tracks on the disk surface, or to test the surface in a spiral pattern.

The techniques for manufacturing hard disk platters with vertical magnetic domains are known in the art and are not considered to be part of the present invention. Accordingly, the manufacturing techniques will not be described, except to note that the magnetic recording layer is relatively thicker than in a disk having horizontally oriented magnetic domains, and that vertical disks require the use of a relatively thick underlayer of highly permeable magnetic material to act as a return path for the magnetic flux lines. The greater thickness of these layers adds manufacturing complexity and increases the difficulty of obtaining highly uniform films, thereby increasing the likelihood of small surface irregularities.

According to the present invention, the vertical magnetic domains to be tested are all oriented in the same direction. After manufacture, the magnetic domains on the disk platters are randomly oriented. Accordingly, action is required to orient all of the domains in the same direction. Preferably, this is achieved by performing a DC erase of the disk, in a known manner. In one embodiment, a bulk DC erase is performed using a degausser. Alternatively, in another embodiment, the vertical magnetic domains are oriented in the same direction using a write head. In this alternative embodiment, it is not necessary that all of the domains on the disk be oriented prior to further testing. Instead, for example, testing can proceed on a track-by-track basis, i.e., the domains in a track are first oriented in the same direction using a write head, and then the properly oriented track is tested using a read head. As described above, when all of the domains in a vertically oriented disk are aligned, the magnetic field adjacent to the surface is, absent any defects, substantially uniform.

Figure 2A:
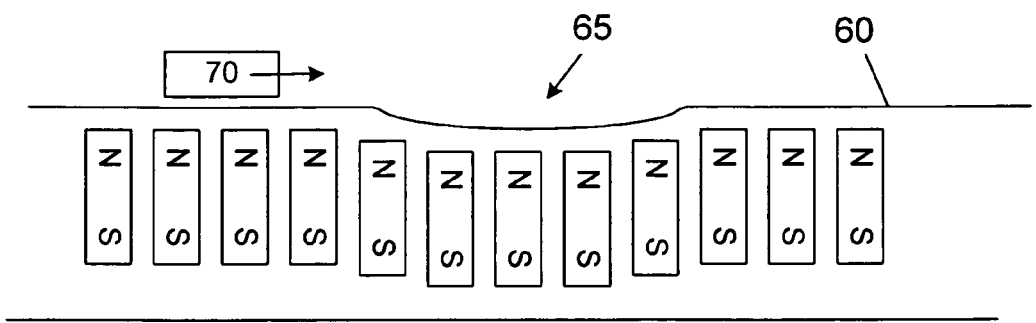
FIG. 2 is a schematic cross-sectional depiction of a portion of the surface of a vertically oriented hard disk platter having a surface irregularity.
Figure 2B:
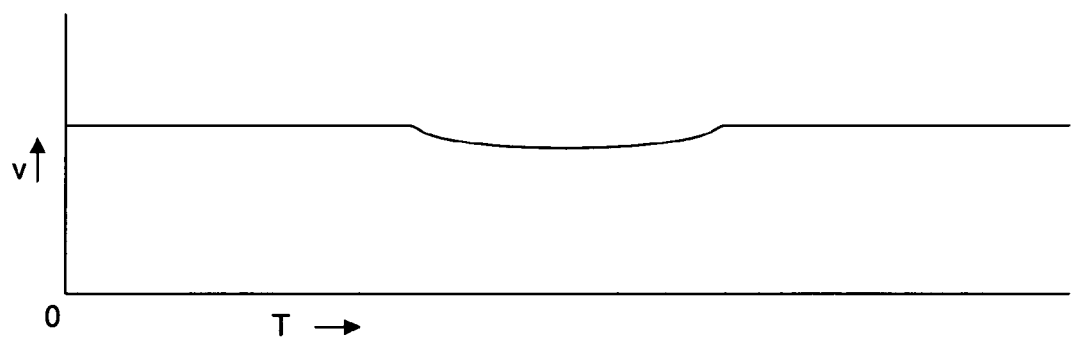

According to the present invention, non-uniformities or perturbations in the magnetic field are measured and used to identify defects in the magnetic film. FIG. 2A schematically depicts a vertical disk surface 60 with a non-planar region 65. Non-planar region 65 may be a pit, a scratch, or other surface defect created as an artifact of the manufacturing process or subsequent disk handling. A read head 70 moves relative to the disk surface 60. As read head 70 passes over non-planar region 65, the spacing between read head 70 and surface 65 increases and, as a consequence, the magnitude of the magnetic field detected by head 70 decreases. FIG. 2B shows the output signal from read head 70 as it passes over non-planer region 65 and the adjacent planar regions. The change in the magnetic field uniformity is used, in accordance with the present invention, to identify film defects.

Figure 3:
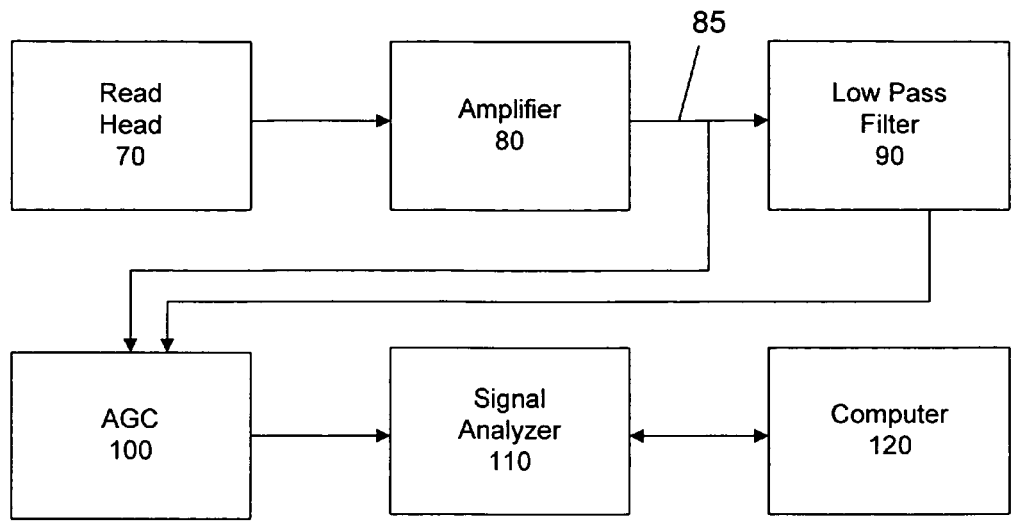
FIG. 3 is block circuit diagram of the error detecting system of the present invention.

FIG. 3 is a block circuit diagram of an error detecting system in accordance with an embodiment of the present invention. A read head 70 continuously measures the magnetic field adjacent to the surface of the disk undergoing testing. In accordance with the present invention, the read head is moved relative to the surface of the disk, so that it can be used to measure the magnetic field over the entire useable surface of the disk. As is well know, relative motion is achieved by rotating the disk and translating the read head radially using a carriage assembly. The read head may comprise a coil that generates a weak electrical signal as it intercepts magnetic field (flux) lines emanating from the disk surface, with the magnitude of the electrical signal being a function of the magnetic field intensity. Alternatively, the read head may comprise a piece of magnetoresistive ("MR") or giant magnetoresistive material ("GMR"), i.e., a material that changes resistance with changes in magnetic field intensity. (As is well known, a MR or GMR sensor requires use a bias signal.)

In either case, the signal from the read head is fed to amplification circuit 80, which preferably comprises two stages—a preamplifier and an amplifier—to provide an output signal 85. Output signal 85 is fed through a low pass filter 90 to extract, i.e., pass, low frequency components. In one embodiment, low pass filter 90 extracts frequency components less than about 1 MHz. The extracted low frequency components form an input to automatic gain control ("AGC") circuit 100 which is used to maintain the DC level of signal input to signal analyzer 110 at a constant amplitude. As shown in FIG. 3, output signal 85 is also directed to AGC circuit 110. AGC circuit 110 uses the output of low pass filter 90, in a known manner, to cancel the low frequency components of signal 85, while the high frequency components of signal 85 are inputted into signal analyzer 110. As described below, signal analyzer 110, which is used to detect non-uniformities in the magnetic field, can be implemented using either analog or digital circuitry.

It is noted that any surface irregularity, such as depicted in FIG. 2, creates an abrupt (high frequency) transient in signal 85 which passes through AGC circuit 100 to signal analyzer 110. According to the preferred embodiment of the present invention, the magnitude and duration of any transients in the signal are measured, and an error signal, indicating the presence of a film defect, is generated if either the magnitude or duration, or some combination of the two, exceed predetermined threshold values. Preferably, the threshold values are user selectable using computer 120.

It will be appreciated that it is necessary to determine the exact position of the disk platter when the error signal is generated. The position of the defect is determined by the radial position of the head and the angular position of the disk, and is determined using an index signal generated by the spindle. Information about the position of the defect is stored and may be used for retesting the defect area. Defects may be grouped together to determine if they make up a larger defect. For example, using stored information about a group of defects, it can be determined if they are along a line, in which case they may be part of a scratch on the media surface.

Figure 4A:
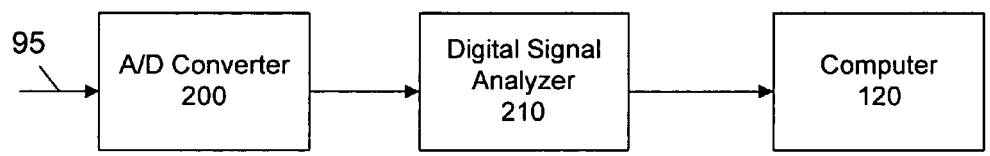
FIG. 4A is a circuit diagram of a digital implementation of the signal analyzer of the present invention.

In one embodiment, signal analyzer 110 comprises digital circuitry, as depicted in FIG. 4A. Analog signal 95 is digitized at A/D converter 200. In one embodiment two parallel A/D converters are used, each of which samples signal 95 at the rate of 250M samples per second, for a total sampling rate of 500M samples per second. The very short time slices correspond to reading the magnetic field intensity over very small areas of the disk platter being tested. The output of A/D converter 200 is processed by digital signal analyzer 210 which generates an error signal whenever it senses a change in the sampled value. As noted, preferably, digital signal analyzer applies user definable thresholds, so that an error signal is not generated unless the sampled value varies by a predetermined amount and a variance lasts for a predetermined duration. Preferably, digital signal analyzer operates under the control of computer 120, and outputs error signals to computer 120.

Figure 4B:
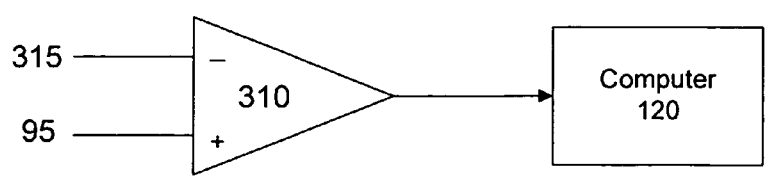
FIG. 4B is a circuit diagram of an analog implementation of the signal analyzer of the present invention.

In an alternative embodiment, depicted in FIG. 4B, signal analyzer 110 comprises analog circuitry. In this embodiment analog signal 95 from filter 90 is used as one input into op-amp 310, with a predetermined threshold value 315 is the second input. Any variation between the signal value and the threshold value causes op-amp 310 to generate an error signal, which is then input to computer 120, which processes the information. Again, computer 120 is preferably programmed to report such errors only if they exceed threshold values for magnitude and duration.

Implementation of the present invention requires periodic calibration of the read head signal. In one embodiment, calibration is achieved by writing a predetermined frequency of known amplitude to one or more radial tracks on a disk, and then reading back the recorded information. The information is then used to set the gain of the read head channel. Calibration is accomplished by writing an AC signal and adjusting the front end gain until the read back signal is at the desired signal level. Calibration can be performed once per disk, or periodically on a standard disk, with the gain value for subsequent testing of disk platters being set based on the standard disk. As noted above, the system gain is further controlled using an AGC circuit based on low frequency variations in the read head signal.

In a further embodiment of the present invention, the foregoing testing method and system can be combined with other standard tests to provide additional information about the disk platter. Thus, for example, the hardware used to implement the present invention can also be used with a sinusoidal write signal to perform missing pulse, extra pulse and thermal asperity testing.

The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are not intended to be limiting of the scope of the invention, which is set forth in the following claims.

What is claimed is:

1. A method of inspecting an unformatted hard disk platter having vertically oriented magnetic domains for defects, comprising the steps of:
   orienting the magnetic domains in the same vertical direction,
   scanning the surface of the disk using a read head to acquire an analog signal used to identify perturbations in the magnetic field intensity;

filtering the analog signal from the read head;
using low frequency components of the filtered signal for automatic gain control; and
using high frequency components of the filtered signal to identify variations in the magnetic field picked up by the read head.

2. The method of claim 1 wherein the step of orienting the magnetic domains comprises performing a DC erase of the disk surface.

3. The method of claim 2 wherein the step of performing a DC erase comprises a bulk erase operation.

4. The method of claim 2 wherein the step of performing a DC erase comprises using a write signal from a write head to sequentially orient the domains.

5. The method of claim 1 wherein said step of scanning the surface of the disk comprises sampling the signal picked up by the read head at a high frequency.

6. The method of claim 2 wherein said high frequency exceeds 200 MHz.

7. The method of claim 5 wherein said high frequency exceeds 250 MHZ.

8. The method of claim 1 wherein said scanning is performed on a plurality of concentric tracks.

9. The method of claim 1 wherein said scanning is performed in spiral.

10. The method of claim 1, further comprising generating an error signal when the magnetic field detected by the read head varies by a predetermined threshold amount.

11. The method of claim 10 wherein the predetermined threshold amount is user selectable.

12. The method of claim 10 wherein no error signal is generated until the threshold amount is exceeded for a predetermined duration.

13. The method of claim 12 wherein the predetermined duration is user selectable.

14. The method of claim 1, further comprising calibrating the gain of the read head signal before testing.

15. The method of claim 14, wherein said step of calibrating is performed each time a new disk is tested.

16. A system for quality testing hard disks having vertically oriented magnetic domains, comprising:
  means for orienting the magnetic domains of the hard disk in the same direction,
  a read head comprising a magnetic sensor for detecting the magnetic field at the surface of the disk adjacent to said read head and for generating an output signal,
  a transport mechanism for providing relative motion between the surface of the disk and the read head such that the read head is able to access substantially the entire useable surface of the disk,
  a signal analyzer for analyzing the output signal from the read head, said signal analyzer comprising:
    a signal amplifier for amplifying the output signal from said read head,
    a filter coupled to said signal amplifier for removing low frequency variations in the amplified signal,
    an automatic gain control (AGC) system coupled to said filter, said AGC system using said low frequency variations to provide automatic gain control,
    a measurement system coupled to said filter for detecting high frequency variations in the amplified signal representative of variations in the magnetic field intensity detected by said read head, and for generating an error signal when there is a variation in excess of a predetermined amount.

* * * * *